March 19, 1963
H. R. RHODES
3,082,012
EXPANSION JOINT AND STUFFING BOX
Filed Feb. 5, 1959
2 Sheets-Sheet 1
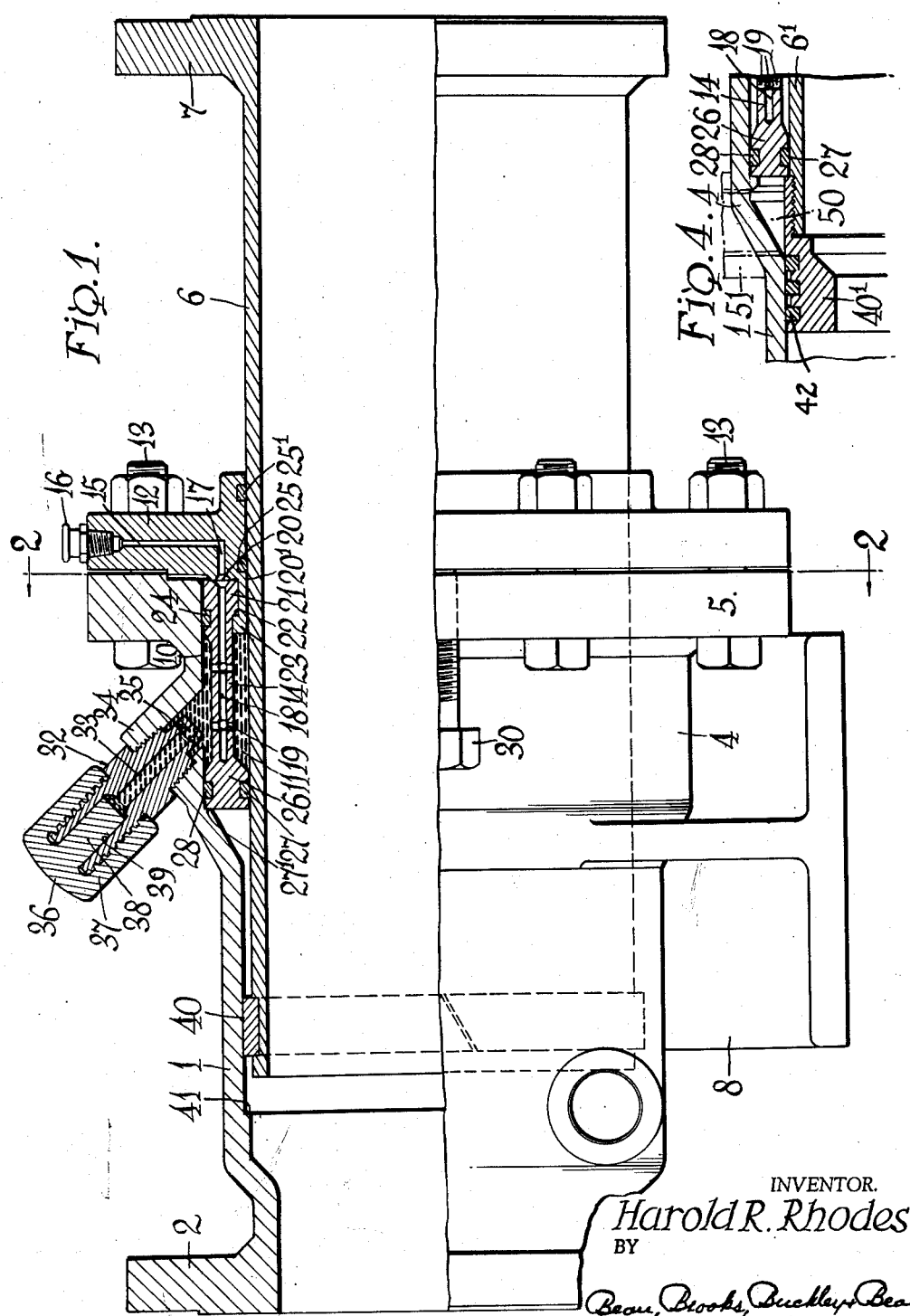
INVENTOR.
Harold R. Rhodes,
BY
Bean, Brooks, Buckley & Bean
ATTORNEYS.

March 19, 1963   H. R. RHODES   3,082,012
EXPANSION JOINT AND STUFFING BOX
Filed Feb. 5, 1959   2 Sheets-Sheet 2
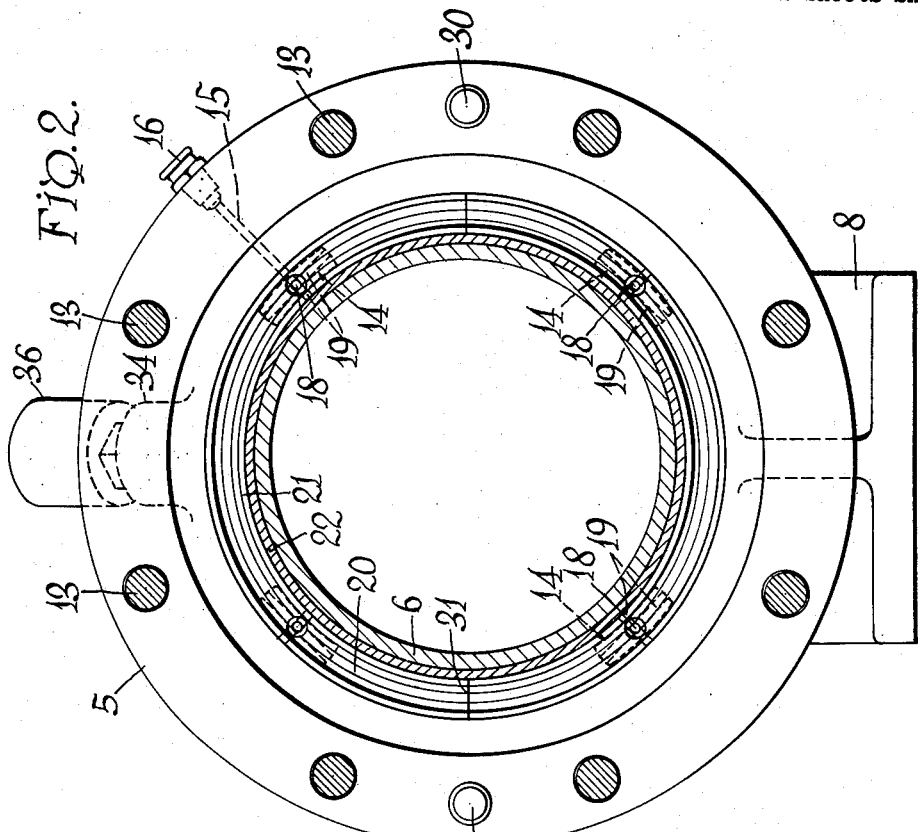
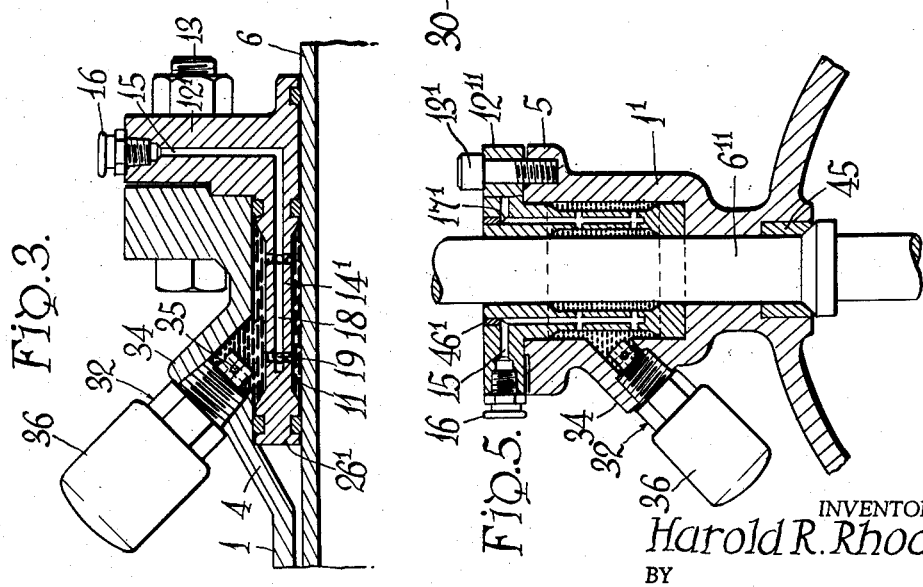
INVENTOR.
Harold R. Rhodes,
BY
Beau, Brooks, Buckley & Beau.
ATTORNEYS US Patent Office 3,082,012
Patented Mar. 19, 1963

3,082,012
EXPANSION JOINT AND STUFFING BOX
Harold R. Rhodes, North Tonawanda, N.Y., assignor to Yuba Consolidated Industries, Inc., Buffalo, N.Y.
Filed Feb. 5, 1959, Ser. No. 791,333
7 Claims. (Cl. 277—69)

This invention relates to packed expansion joints, stuffing boxes, and the like, and to certain new and useful stuffing box constructions for expansion joints and other fluid sealing purposes.

It is known to use packing material in expansion joints of the slip type, and in stuffing boxes for rotary and/or reciprocating shaft seals, and the like, to provide a fluid tight seal, and when such packing material is initially packed in the chamber it is in a semifluid condition. Such resilient condition of the packing is essential if a fluid tight seal is to be achieved. However, in use, particularly with steam or other high temperature lines, the packing material tends to dry out and cake, resulting in loss of the fluid tight seal. When this occurs, the packing material must be replaced with fresh packing, which necessitates shutting down the line and removing the joint from the system. This is undesirable in view of the inconvenience, labor and expense involved.

It is known that, if such packing material is maintained in a lubricated and therefore resilient condition, its useful life can be greatly extended. However, so far as I am aware no practical means for effectively lubricating the mass of plastic material heretofore has been devised.

Accordingly, it is a primary object of my invention to provide a stuffing box assembly for expansion joints and other uses, which assembly incorporates means for conveniently lubricating substantially the entire mass of plastic packing material while the same is in active service, thereby to maintain the packing material in the requisite resilient condition.

It is another object of my invention to provide an expansion joint having a lubricated stuffing box section enabling the complete replacement of packing material therein without removing the joint from the system.

Still another object of my invention is to provide an expansion joint having a lubricated stuffing box section enabling the complete replacement of packing material therein without shutting down the system.

In one aspect thereof, a stuffing box constructed in accordance with my invention is characterized by the provision of inner and outer members, at least one of which is movable relative to the other, a packing chamber between the members, packing material in the chamber, and means for lubricating the packing material when the stuffing box is in service including a member in the packing having a lubricating passage therethrough, and a gland element operatively connected to the member in the packing and having a lubricating passage communicating with the member in the packing and with the exterior of the chamber.

The foregoing and other objects, advantages and characterizing feature of a joint and stuffing box constructed in accordance with my invention will become clearly apparent from the ensuing detailed description of certain presently contemplated specific embodiments thereof, taken in conjunction with the accompanying drawings illustrating such embodiments wherein like reference numerals denote like parts throughout the various views and wherein:

FIG. 1 is a longitudinal quarter-sectional view through one form of expansion joint constructed in accordance with my invention;

FIG. 2 is a transverse sectional view thereof, taken about on line II—II of FIG. 1;

FIG. 3 is a fragmentary, longitudinal sectional view of a modified stuffing box section therefor;

FIG. 4 is a fragmentary, longitudinal sectional view of a modified joint detail; and, FIG. 5 is a fragmentary, longitudinal sectional view of a stuffing box of my invention in conjunction with a rotary shaft seal.

Referring now in detail to the accompanying drawing, the embodiments shown therein are intended for illustrative purposes only and not by way of limitation, and it will be appreciated that my invention comprises both a packed expansion joint having as a part thereof a stuffing box section and a stuffing box for use as a rotary or reciprocating shaft seal and other known purposes.

FIGS. 1 and 2 illustrate an expansion joint constructed in accordance with my invention and comprising an outer member 1, which can be provided at its outer end with either a flange 2 or a weld end (not illustrated) for connection to a pipe line (not illustrated). Adjacent its inner end member 1 has an enlarged body portion 4 terminating in a lateral flange 5. A drip connection can be provided intermediate its ends. The outer joint member 1 telescopically receives an inner joint member 6 in the form of a slip coaxial therewith and terminating at its outer end in a flange 7, or a weld end (not illustrated) if desired, for attachment to a pipe line (not illustrated). A base or stand 8, carried by outer member 1, can be provided.

A particular feature of the expansion joint of my invention resides in the stuffing box section, which comprises an annular chamber 10 formed within the enlarged body 4 between inner and outer members 6 and 1. Chamber 10 is filled with packing material 11 comprising a fluent packing of, for example, asbestos fiber, graphite and a high temperature lubricant, or any other desired packing material, hereinafter referred to as a plastic packing material. An outer, annular gland element 12 is secured to the flange 5 of member 1, as by bolts 13, and a plurality of lubricant distributing members 14, extend inwardly into chamber 10 from element 12. The members 14 are positioned about inner member 6 in spaced apart relation to each other and to the inner and outer joint members, and are embedded in and surrounded by the plastic packing material 11. A generally radial lubricating passage 15 extends into gland element 12 from a conventional, externally positioned fitting 16 to an axial extension 17 which communicates with an axial lubricating passage 18 in one of the lubricant distributing members 14. Each member 14 has an axial passage 18 which communicates with axially spaced sets of lateral passages 19 positioned for example 90° apart (in other words, in the plane of the paper and in a plane at right angles thereto, out of the paper), whereby lubricant introduced through the fitting 16 and passages 15 and 17 passes through the passages 18 and outwardly through passages 19 into the packing 11. In this way, lubricant is distributed by the members 14 substantially throughout the mass of packing material 11, to maintain the same lubricated in a highly convenient and simple but very effective manner.

In the embodiment of FIGS. 1 and 2, the members 14 are separate from gland element 12, and are formed at one end with an enlarged head forming part of an annular outer element 21 shouldered at 22 to cooperate with a shouldered extension 23 of element 12, for causing members 14 to move with gland element 12 lengthwise or axially of the joint, for a purpose to be described.

If desired, a fitting 16 and cooperating passages 15 and 17 can be provided for each lubricant distributing member 14. However, in the embodiment of FIGS. 1 and 2, I provide the abutting faces of elements 12 and 21 with annular grooves providing a lubricant manifold passage 20 receiving lubricant from the one fitting 16 and passage 15, 17 and distributing it to each of the lubricant distributing members 14.

To seal the outer end of the chamber 10, a metallic snap ring seal 24 can be provided around the outer periphery of the element 21, and a second seal 25, which also can be a metal snap ring, is carried by gland element 12, the seals 24 and 25 bearing against the joint members 1 and 6, respectively. The inner ends of members 14 also are enlarged, and comprise part of an annular end element 26 adapted to abut a shouldered portion 27' of the enlarged body 4 and carrying inner and outer metallic snap ring seals 27 and 28 bearing against joint members 6 and 1, respectively.

The fluent packing material 11 is thereby sealed in chamber 10, and can be periodically lubricated as above described to insure a long life.

Should it become necessary to renew or replace the packing material 11, that operation is facilitated and expeditiously accomplished by the stuffing box construction of my invention. To this end, the slip 6 is provided with a substantially unobstructed outer peripheral portion, enabling movement of gland element 12 axially therealong, away from the outer joint member 1. This movement is conveniently accomplished by loosening the nuts 13, to permit such separation of element 12 and flange 5, and then turning jack screws 30 which provide a high mechanical advantage, to move element 12 away from the flange 5, carrying with it the members 14 and, because of the seals 27 and 28, the packing material 11 which is to be replaced. When the members 14 and the worn packing 11 are exposed, the members 14 are readily separated from the gland element 12 and removed from about slip 6, by simply moving the same radially outwardly, which movement is permitted in this embodiment because the inner annular element 26 is split, as indicated at 31, into peripheral segments. Such removal of the members 14 and element sections 26 from about the inner joint member 6 facilitates removal of the worn packing material 11 from the joint.

To repack the joint, and when initially packing it, the members 14 are partially inserted into chamber 10, with the reduced thickness portion thereof between the ends 21 and 26 partly exposed. The packing material then is fitted therearound into the chamber 10, and this is continued until no more material can be inserted in this manner. Then, the members 14 are fully inserted and the gland element 12 is secured to the outer member 1, and the remaining packing material is inserted through a passage 33 in a fitting 32 threaded in a socket 34 in body 4, the passage 33 terminating in lateral passages 35 to avoid misleading back pressure. Such misleading pressure results from pressure leaking past ring 28 and tending to force out the packing when cap 36 is backed off. The use of multiple small openings 35, instead of one large opening, eliminates this effect. Material is inserted into chamber 10 through passage 33 and then, when the chamber appears to be filled, a cap 36 in the form of a ram is threaded onto the fitting 32, which is exteriorly threaded to engage the internally threaded skirt 37 of cap 36. The cap 36 has a ram portion 38 which enters a passage portion 39 of enlarged diameter. In this way, by simply threading home the ram 36, the filling of chamber 10 with packing material under pressure is completed.

This packing ram also is an important feature of my invention, because it provides a convenient means for placing the packing material under the requisite final pressure, in an arrangement where the packing material does not jam the threads. This is because the threads are positioned externally of the fitting, as clearly distinguished from the jamming which would occur if the threaded engagement were between ram portion 38 and the inner wall of fitting 32.

It is noted that the snap ring seal 25 tends to clean the slip surface 20', and preclude the entry of particles into the packing material. Further to this end, a wiper ring 25' of compressed asbestos or other fabric can be carried by the gland element 12, for wiping along slip 6.

It is another feature of the joint of my invention that the gland element 12 functions as an outer guide for slip 6, and that an inner guide and limit stop is provided in the form of a split snap ring 40 carried by the slip 6 and bearing against the inner wall of member 1. Ring 40 is adapted to abut an internal shoulder 41 on joint member 1 to provide an inner limit stop for the joint, and to abut the annular element 26 carried by the lubricant distributing members 14 to provide an outer limit stop, in each instance providing a one hundred percent, full contact stop surface to better withstand the end thrust upon the joint. This is very important, when it is remembered that a six inch joint can have an end thrust exceeding 5 and ½ tons. With the rings of my invention, providing a full, annular contact, such thrust is safely resisted. It is noted that ring 40 can be split on a diagonal, to avoid any possibility of grooving the inner wall surface of the body 1, and of course, ring 40 could be threaded on the end of slip 6.

Therefore, it is seen that the joint illustrated in FIGS. 1 and 2 offers many advantages. FIG. 3 illustrates a variation, wherein the gland element 12', members 14' and end element 26' comprise an integral, one-piece construction. It will be seen that the various advantages heretofore described including the effective lubrication of the packing material and ease of removal of packing material to be replaced, are provided. In this form, when the gland 12' is backed off, away from flange 5 to expose the members 14' and the used packing 11, because of the integral construction the members 14' can not be removed from about the inner element 6, and the packing material is chipped out from around the members 14'. Also, I prefer in this instance to provide a lubricating fitting 16 and passage 15 for each member 14', although it is possible to provide an internal, annular lubricant distributing passage in the gland 12' in a manner similar to that hereafter described with reference to FIG. 5.

Because the packing material 11 can be removed by removing the members 14, 14' from the packing chamber 10, it will be seen that the packing material can be entirely replaced in the joints of FIGS. 1 and 3 without removing the joints from the system. Where it is desired to provide a joint enabling the replacement of packing material without shutting down the system, a construction such as that illustrated in FIG. 4 can be use. In this embodiment the lubricating portions remain the same, but the inner end of slip 6' has a guide ring 40' threaded thereon, which guide ring has a greater external diameter than slip 6' to provide a shoulder abutting the inner element 26 of the lubricating assembly to provide an outer limit stop, as illustrated in FIG. 4. For an inner limit stop, the ring 40' will abut a shoulder such as illustrated at 41 in FIG. 1. Also, guide ring 40' carries suitable sealing means, the illustrated embodiment showing three piston rings 42 which bear against the inner wall of outer member 1 in fluid sealing relation therewith, thereby enabling removal of the lubricating assembly for replacing the packing even while the system is kept in service. The outer limit stop is designed so that the rings 42 will at all times have fluid sealing engagement with joint member 1.

To relieve pressure in the expansion chamber 50, and thereby enable replacement of packing 11, a vent 51 of known form is provided and is held open during the repacking operation. While the schematic showing of vent 51 shows the same extending from an upper portion, in actual practice it will of course extend from the lowest portion of the chamber 50.

FIG. 5 illustrates a stuffing box of my invention, which generally follows the construction illustrated in FIG. 3 and described above. However, in this case, the outer member 1' can comprise part of a pump housing, valve bonnet or other structure, from which extends a valve stem 6″, which can also be a pump shaft or other rotary and/or reciprocating element, and which can be journaled in a bearing 45. The gland element 12′ is secured to the flange 5 as by bolts 13′. In this embodiment, a lubricating fitting 16 is provided for each lubricant distributing member 14′, the gland having passages 15 from the fittings to passages 17′ which lead to passages 18 and which can be formed by drilling in from the outer end of gland element 12′, and then plugging the outer portion thereof.

In all other respects, the lubricated stuffing box of FIG. 5 operates in the manner heretofore described, in that the same can be filled with plastic material as described above and periodically lubricated in a manner obvious from the foregoing description. So also, when desired the used packing 11 can be removed, in the manner previously described.

Accordingly, it is seen that my invention fully accomplishes its intended objects, and it will be appreciated that my invention is not necessarily limited to the details of the above-described embodiments and that the same can be varied and modified without departing from the spirit of my invention and the scope of the appended claims.

Having fully disclosed and completely described my invention, and its mode of operation, what I claim as new is:

1. In a device of the class described, a stuffing box section comprising, generally coaxial inner and outer members, means providing an annular packing chamber between said members, plastic packing material in said chamber, a generally annular outer element positioned about said inner member adjacent one end of said chamber, multiple lubricating members extending into said packing from said element substantially to the other end of said chamber, said lubricating members being positioned about said inner member in spaced apart relation to each other and to said inner and outer members, a generally annular inner element connected to said lubricating members adjacent said other end of said chamber, and lubricating passage means extending through said outer element and said lubricating members enabling lubrication of said packing material while said stuffing box section is in service.

2. The combination set forth in claim 1, wherein said inner and outer elements and said lubricating members comprise an integral construction, and said inner member has a substantially unobstructed outer peripheral portion adjacent said outer member enabling removal of said lubricating members from said chamber by movement of said outer element along said inner member away from said outer member, thereby facilitating replacement of packing material in said chamber.

3. The combination set forth in claim 1, wherein said inner element is formed of multiple peripheral segments, and wherein said lubricating members and said outer element have cooperating shoulders causing removal of said lubricating members from said chamber upon movement of said outer element away from said outer member while thereafter enabling separation of said lubricating members from said outer element and removal thereof from about said inner member, thereby facilitating replacement of packing material in said chamber.

4. An expansion joint comprising, generally coaxial inner and outer joint members, means defining an annular packing chamber between said joint members, packing material in said chamber, a gland element connected to said outer joint member adjacent the outer end of said chamber, multiple lubricant distributing members extending into said chamber from said gland element in spaced apart relation around said inner joint member, said lubricating members being embedded in said packing material, lubricating passage means through said gland element and said lubricant distributing members, means defining a generally annular inner element around said inner joint member, said inner element being connected to said lubricant distributing members adjacent the inner end of said chamber, said gland element comprising an outer guide for said inner joint member, and a ring carried by said inner joint member on the side of said chamber opposite said gland element, said ring having sliding engagement with said outer joint member to comprise an inner guide for said inner joint member, and said ring being aligned with said inner element to abut the same and thereby provide an outer limit stop for said joint.

5. An expansion joint as set forth in claim 4, together with piston ring means carried by said inner guide ring in sealing engagement with said outer member.

6. In a device of the class described, a stuffing box section comprising, generally coaxial outer and inner members, said outer member having an attaching flange, means providing an annular packing chamber between said members, plastic packing material in said chamber, a generally annular flanged gland element positioned about said inner member adjacent one end of said chamber, said flanged element normally being secured to said outer member flange, at least one lubricant distributing member extending into said packing from said element element substantially to the opposite end of said chamber and being embedded in said packing, lubricating passages through said element and said lubricating member for lubricating said packing while said section is in service, and jack screws carried by said outer member flange for bearing against said gland element to move the same away from said outer member flange and thereby remove said lubricant distributing member.

7. In a device of the class described, a stuffing box section comprising, generally coaxial inner and outer members, means providing an annular packing chamber between said members, plastic packing material in said chamber, a generally annular element positioned about said inner member adjacent one end of said chamber, at least one lubricating member extending into said packing lengthwise of said section from said element substantially to the opposite end of said chamber, said lubricating member having a first lubricating passage therein extending lengthwise of said section and communicating with sets of lateral lubricating passages spaced apart lengthwise of said lubricating member and opening therethrough into said packing, and lubricating passage means communicating with said first lubricating passage through said element for lubricating said packing while said section is in service, wherein said element and said lubricating member are releasably interconnected for retracting said lubricating member out of said chamber by and upon movement of said element lengthwise of said inner and outer members, said lubricating member being separable from said element when so retractetd from said chamber.

References Cited in the file of this patent

UNITED STATES PATENTS

| 722,219 | Fielden | Mar. 10, 1903 |
| 1,025,319 | Sherman | May 7, 1912 |
| 1,163,461 | Robertson | Dec. 7, 1915 |
| 1,208,732 | Bockstahler | Dec. 19, 1916 |
| 1,285,430 | Sheppy | Nov. 19, 1918 |
| 1,585,433 | Sudekum | May 18, 1926 |
| 1,844,903 | Queen | Feb. 9, 1932 |
| 1,908,860 | Parsons | May 16, 1933 |
| 1,989,644 | McKee | Jan. 29, 1935 |
| 2,234,520 | De Shong | Mar. 11, 1941 |
| 2,323,179 | Hall et al. | June 29, 1943 |
| 2,444,874 | Hanson | July 6, 1948 |

FOREIGN PATENTS

| 684,137 | France | Mar. 11, 1930 |